Patented Sept. 4, 1951

2,566,923

UNITED STATES PATENT OFFICE 2,566,923

ONE-PHASE ANTIRUST LIQUID CONTAINING AN ALKALI METAL BORATE AND MIXED MONORICINOLEATE ESTERS

Lloyd M. Burghart, Darien, Conn., assignor, by mesne assignments, to National Distillers Products Corporation, New York, N. Y., a corporation of Virginia No Drawing. Application November 13, 1947, Serial No. 785,826

13 Claims. (Cl. 252—76)

This invention relates to one-phase, liquid antirust concentrates, and more particularly to such concentrates which are suitable for packaging in small units sized for convenient treatment of individual pieces of equipment, such as automobile radiators, etc.

It has become quite generally recognized that protection of an automobile radiator against corrosion during summer driving is just as important as the use of a properly inhibited antifreeze solution (e. g., ethylene glycol) in winter driving. Generally speaking, any inhibitor or combination of inhibitors contained in an antifreeze may be expected to yield as good corrosion protection if supplied to the water used in a radiator during the summer season. That this is true may be inferred from the fact that most antifreeze producers have at one time or another attempted to market some form of concentrate of the antirust ingredient or ingredients which they add to their antifreeze solutions.

If the corrosion inhibitor is a single chemical compound, whether liquid or solid, the preparation of suitable unit packages is a simple and obvious matter. If the inhibitor is a composition and the individual components are solid, the preparation of a unit package is practically as easy as for the preceding. If a liquid antirust composed of mixed inhibitors is to be prepared and the individual components are known to be soluble in a specified common solvent, there is still little difficulty in marketing the antirust as a one-phase product. If, however, the inhibitor components are unlike in type (i. e., both organic and inorganic) and are not known to be soluble in any common solvent, a field for extensive experiment opens up when one attempts to prepare a highly concentrated one-phase product containing such components.

It is therefore an object of this invention to prepare a one-phase, liquid antirust concentrate containing unlike types of corrosion inhibitors.

It is also an object of this invention to prepare a one-phase, liquid antirust concentrate containing an alkali metal borate, an alkali metal nitrite and a mixture of monoricinoleates of ethylene glycol and glycerol.

The aforementioned and other objects are accomplished in accordance with this invention by mixing the alkali metal borate, alkali metal nitrite and mixture of monoricinoleates of ethylene glycol and glycerol in a solvent which consists of a mixture of ethylene glycol or propylene glycol and isopropanol, n-butanol or tert.-butanol.

The table which follows illustrates various one-phase compositions falling within the scope of the present invention, and the examples contained therein are to be considered not limitative thereof.

Table

| Constitutent | Example | | | | |
|---|---|---|---|---|---|
| | I | II | III | IV | V |
| Ethylene glycol, ml | 71.58 | 75.97 | | | |
| Propylene glycol, ml | | | 66.21 | 78.46 | 78.46 |
| Isopropyl alcohol, ml | | 13.72 | | | |
| n-Butyl alcohol, ml | 28.42 | 10.30 | | 21.54 | 21.54 |
| tert.-Butyl alcohol, ml | | | 33.79 | | |
| Orthoboric acid, gm | 18.09 | 16.28 | 16.16 | 18.25 | 37.19 |
| Sodium hydroxide,[1] gm | 10.35 | 9.49 | 8.51 | 12.45 | 12.05 |
| Sodium nitrite,[1] gm | 1.38 | 1.31 | 1.19 | 1.41 | 1.41 |
| Monoricinoleate mixture, gm | 42.45 | 41.00 | 36.81 | 44.28 | 44.17 |

[1] Added as 40% aqueous solutions.

Various modifications may be made in the specific compositions described in the examples to provide a one-phase, liquid antirust concentrate falling within the scope of the present invention. Thus, the relative proportions of the glycol and the alcohol may be varied so that the organic solvent portion of the concentrate contains from about 65 to about 95% by volume of ethylene glycol or propylene glycol (or mixtures thereof) and from about 5 to about 35% by volume of i-propanol, n-butanol or tert.-butanol (or mixtures thereof). In addition, the sodium nitrite used in the examples may be replaced by an equal weight of other alkali metal nitrites, such as lithium nitrite or potassium nitrite, and the composition may contain from about 0.005 to about 0.05 gm. of alkali metal nitrite per ml. of glycol-alcohol solvent.

Furthermore, a wide variety of alkali metal borates may be employed in the concentrate as a corrosion inhibitor. In Example IV boric acid and caustic soda were added to the concentrate in the proportions theoretically required to result in the formation of sodium metaborate in the composition, while in Example V the sodium hydroxide and boric acid were added to the composition in the proportions theoretically required to result in the formation of the sodium tetraborate therein. However, instead of preparing the concentrate by adding thereto boric acid and sodium hydroxide, the concentrate may be prepared using sodium metaborate or sodium tetraborate salts as a partial or complete replacement of the boric acid and caustic soda. In addition, the sodium metaborate or tetraborate may be used in the form of mixtures thereof, and may also be replaced by equal weights of other alkali metal metaborates or tetraborates, such as lithium metaborate, potassium tetraborate, etc. In general, the composition of the present invention should be as highly concentrated as possible from the standpoint of the alkali metal metaborate or tetraborate contained therein, and hence it should contain at least about 0.10, and preferably at least about 0.15 gm. of alkali metal metaborate or tetraborate per ml. of glycol-alcohol solvent. The upper limit of concentration of the alkali metal metaborate will generally be about 0.20 gm. thereof per ml. of glycol-alcohol solvent, and the corresponding upper limit for the tetraborate will generally be about 0.32. In this connection the compositions of Examples IV and V give an indication of the practical upper limit of alkali metal metaborate or tetraborate concentration which may be employed in a one-phase concentrate.

The preparation of the mixture of monoricinoleates of glycerol and ethylene glycol may be accomplished by heating in contact with sodium hydroxide a mixture of ethylene glycol and castor oil until a one-phase mixture is obtained, in accordance with procedures which are well taught in the art, for example, in U. S. Patent No. 2,386,182. Here again, the concentration of the monoricinoleate mixture in the composition may be varied. In general, however, the composition should contain at least 0.15 gm. of the monoricinoleate mixture per ml. of glycol-alcohol solvent. The upper limit of concentration of monoricinoleate mixture will generally be about 0.50 gm. thereof per ml. of glycol-alcohol solvent, and here again the examples give a good indication of the upper limit of concentration of the monoricinoleate mixture which may be incorporated into the composition yielding a one-phase product.

The composition of the present invention is essentially a solution of three corrosion inhibitors (alkali metal nitrite, alkali metal metaborate or tetraborate, and mixture of monoricinoleates of glycerol and ethylene glycol) dissolved in a mixture of solvents (ethylene glycol or propylene glycol and i-propanol, n-butanol, or tert.-butanol). The composition may, however, contain certain amounts of other ingredients which do not detract from its utility or advantageous properties, such as dyes or water, the latter of which may be present in an amount up to about 0.35 gm. per ml. of glycol-alcohol solvent.

The composition described herein is a valuable composition of matter in that it is one-phase and hence can be easily dispensed, and also in that about one-half pint thereof will satisfactorily inhibit the corrosion in the average automobile radiator (4 gal. capacity). Furthermore, as will be apparent to those skilled in the art, the composition may be added to heat transfer fluids (e. g., water, monohydric aliphatic alcohols or polyhydric aliphatic alcohols, or mixtures of such alcohols with water) used in a wide variety of other heat transfer apparatus.

I claim:

1. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of an alkali metal nitrite per ml. of glycol-alcohol solvent, from about 0.10 gm. to about 0.20 gm. of an alkali metal metaborate per ml. of glycol-alcohol solvent, and from about 0.15 gm. to about 0.50 gm. of mixed ethylene glycol-glycerol monoricinoleates per ml. of glycol-alcohol solvent.

2. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, about 0.005 to about 0.05 gm. of sodium nitrite per ml. of glycol-alcohol solvent, from about 0.10 gm. to about 0.20 gm. of an alkali metal metaborate per ml. of glycol-alcohol solvent, and from about 0.15 gm. to about 0.50 gm. of mixed ethylene glycol-glycerol monoricinoleates per ml. of glycol-alcohol solvent.

3. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of ethylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycol-alcohol solvent, from about 0.10 gm. to about 0.20 gm. of an alkali metal metaborate per ml. of glycol-alcohol solvent, and from about 0.15 gm. to about 0.50 gm. of mixed ethylene glycol-glycerol monoricinoleates per ml. of glycol-alcohol solvent.

4. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of ethylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 0.20 gm. of sodium metaborate per ml. of glycol-alcohol solvent, and from about 0.15 gm. to about 0.50 gm. of mixed ethylene glycol-glycerol monoricinoleates per ml. of glycol-alcohol solvent.

5. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of an alkali metal nitrite per ml. of glycol-alcohol solvent, from about 0.10 gm. to about 0.20 gm. of an alkali metal tetraborate per ml. of glycol-alcohol solvent, and from about 0.15 gm. to about 0.50 gm. of mixed ethylene glycol-glycerol monoricinoleates per ml. of glycol-alcohol solvent.

6. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycol-alcohol solvent, from about 0.10 gm. to about 0.20 gm. of an alkali metal tetraborate per ml. of glycol-alcohol solvent, and from about 0.15 gm. to about 0.50 gm. of mixed ethylene glycol-glycerol monoricinoleates per ml. of glycol-alcohol solvent.

7. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of ethylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycol-alcohol solvent, from about 0.10 gm. to about 0.20 gm. of an alkali metal tetraborate per ml. of glycol-alcohol solvent, and from about 0.15 gm. to about 0.50 gm. of mixed ethylene glycol-glycerol monoricinoleates per ml. of glycol-alcohol solvent.

8. A concentrated one-phase anti-corrosive liquid solution suitable for addition to water contained in the cooling system of an internal combusion engine to inhibit the corrosion therein, the said liquid consisting essentially of a solvent the non-aqueous constituents of which consist essentially of from about 65 to about 95% by volume of ethylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 0.20 gm. of sodium tetraborate per ml. of glycol-alcohol solvent, and from about 0.15 gm. to about 0.50 gm. of mixed ethylene glycol-glycerol monoricinoleates per ml. of glycol-alcohol solvent.

9. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of an alkali metal nitrite per ml. of glycol-alcohol solvent, from about 0.10 gm. to about 0.20 gm. of a mixture of alkali metal metaborates and tetraborates per ml. of glycol-alcohol solvent, and from about 0.15 gm. to about 0.50 gm. of mixed ethylene glycol-glycerol monoricinoleates per ml. of glycol-alcohol solvent.

10. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of a material selected from the group consisting of ethylene glycol and propylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycol-alcohol solvent, from about 0.10 gm. to about 0.20 gm. of a mixture of alkali metal metaborates and tetraborates per ml. of glycol-alcohol solvent, and from about 0.15 gm. to about 0.50 gm. of mixed ethylene glycol-glycerol monoricinoleates per ml. of glycol-alcohol solvent.

11. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of ethylene glycol and from about 5 to about 35% by volume of a material selected from the group consisting of i-propanol, n-butanol and tert.-butanol, and, dissolved therein, from about 0.005 to about 0.05 gm. of sodium nitrite per ml. of glycol-alcohol solvent, from about 0.10 gm. to about 0.20 gm. of a mixture of alkali metal metaborates and tetraborates per ml. of glycol-alcohol solvent, and from about 0.15 gm. to about 0.50 gm. of mixed ethylene glycol-glycerol monoricinoleates per ml. of glycol-alcohol solvent.

12. A concenttrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of ethylene glycol and from about 5 to about 35% by volume of n-butanol, and, dissolved therein, from about 0.005 to about 0.05 gm. of sodium nitrite per ml. of glycol-alcohol solvent, from about 0.10 gm. to about 0.20 gm. of a mixture of sodium metaborate and tetraborate per ml. of glycol-alcohol solvent, and from about 0.15 gm. to about 0.50 gm. of mixed ethylene glycol-glycerol monoricinoleates per ml. of glycol-alcohol solvent.

13. A concentrated one-phase anti-corrosive liquid solution suitable for addition to water contained in the cooling system of an internal combustion engine to inhibit the corrosion therein, the said liquid consisting essentially of a solvent the non-aqueous constituents of which consist essentially of from about 65 to about 95% by volume of at least one material selected from the group consisting of ethylene glycol and propylene glycol and from about 5 to about 35% by volume of at least one material selected from the group consisting of i-propanol, n-butanol and tert.-butanol, and, dissolved therein, from about 0.005 to about 0.05 gm. of an alkali metal nitrite per ml. of glycol-alcohol solvent, from about 0.10 gm. per ml. to about 0.20 gm. per ml. of glycol-alcohol solvent of at least one material selected from the group consisting of alkali metal metaborates and tetraborates, and from about 0.15 gm. to about 0.50 gm. of mixed ethylene glycol-glycerol monoricinoleates per ml. of glycol-alcohol solvent.

LLOYD M. BURGHART.

REFERENCES CITED

The following references are of record in the file of this patent:

UNITED STATES PATENTS

| Number | Name | Date |
|---|---|---|
| 2,126,173 | Clapsadle et al. | Aug. 9, 1938 |
| 2,386,182 | Balcar | Oct. 9, 1945 |